W. H. SMITH.
COTTON CHOPPER.
APPLICATION FILED SEPT. 10, 1919.

1,383,772.

Patented July 5, 1921.
4 SHEETS—SHEET 1.

Inventor
W. H. Smith
By Lacy & Lacy,
Attorneys

W. H. SMITH.
COTTON CHOPPER.
APPLICATION FILED SEPT. 10, 1919.
1,383,772.
Patented July 5, 1921.
4 SHEETS—SHEET 2.
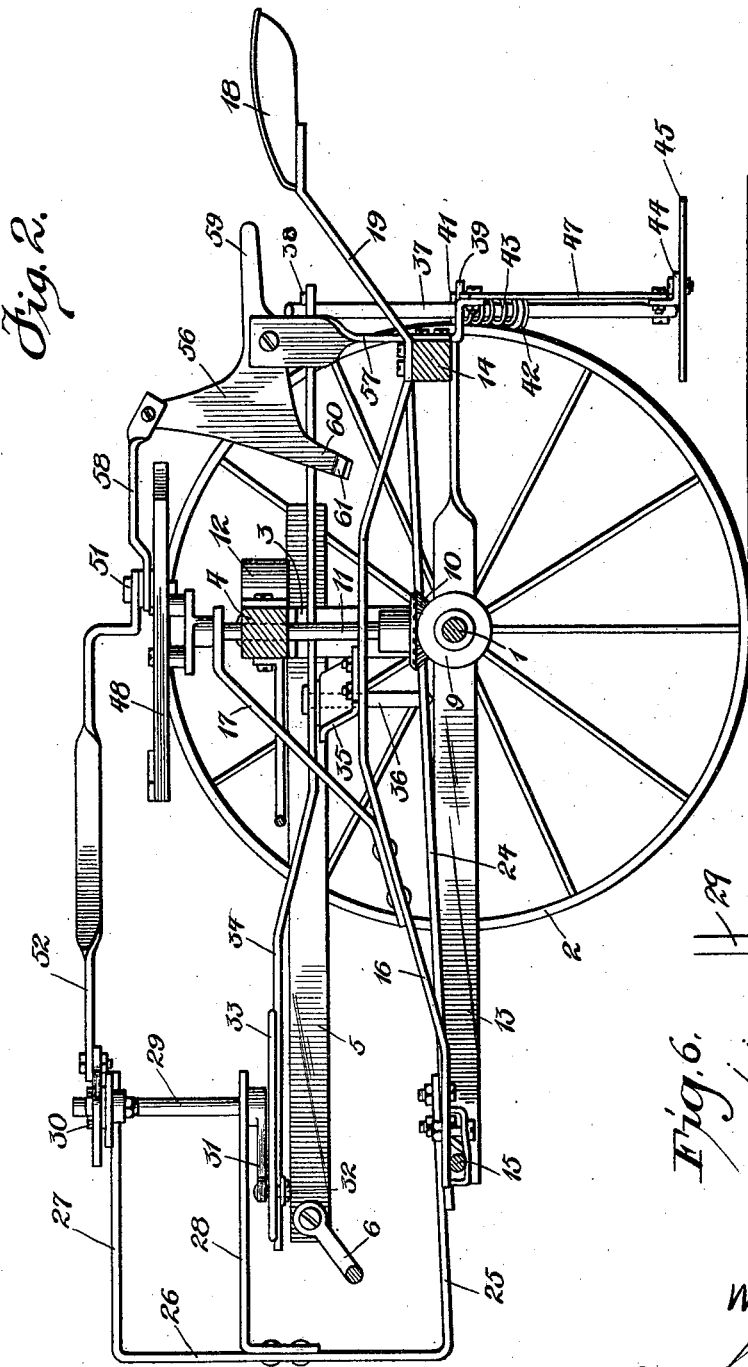
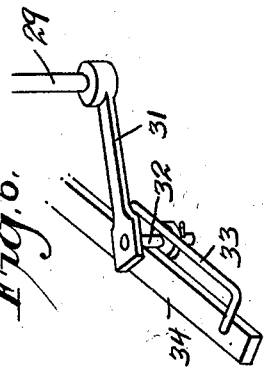
Inventor
W. H. Smith.

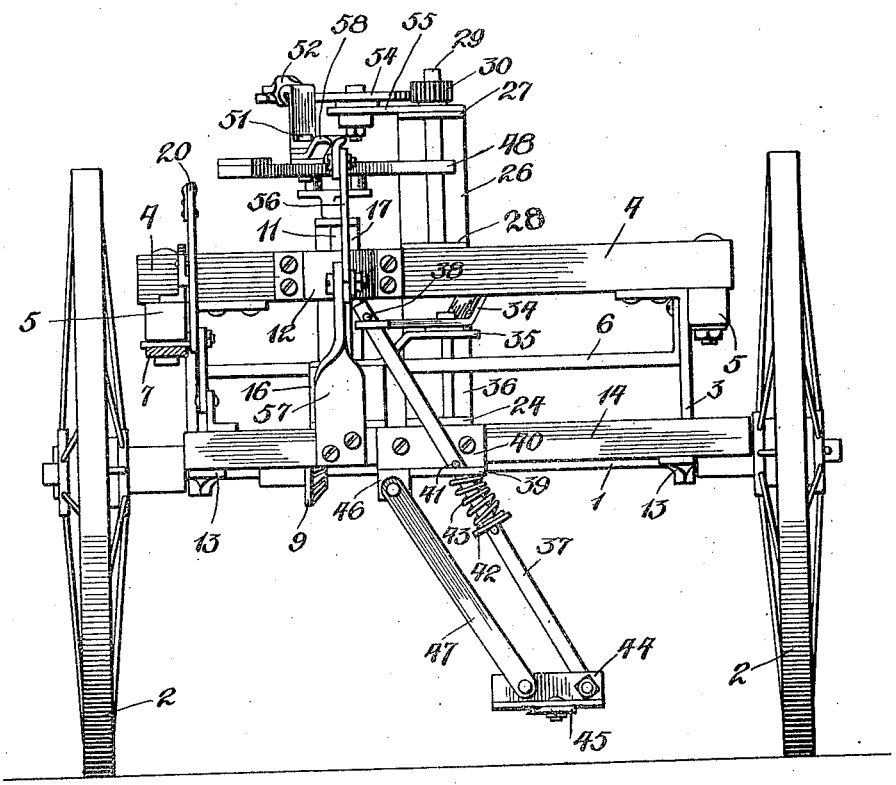

W. H. SMITH.
COTTON CHOPPER.
APPLICATION FILED SEPT. 10, 1919.

1,383,772.

Patented July 5, 1921.
4 SHEETS—SHEET 4.

Inventor
W. H. Smith
By Lacey & Lacey,
Attorneys

UNITED STATES PATENT OFFICE.

WILLIAM H. SMITH, OF PORTLAND, OREGON.

COTTON-CHOPPER.

1,383,772.    Specification of Letters Patent.    Patented July 5, 1921.

Application filed September 10, 1919. Serial No. 322,781.

*To all whom it may concern:*

Be it known that I, WILLIAM H. SMITH, a citizen of the United States, residing at Portland, in the county of Multnomah and State of Oregon, have invented certain new and useful Improvements in Cotton-Choppers, of which the following is a specification.

This invention relates to agricultural machines and has for its object the provision of an inexpensive and easily operated machine by which some of the plants in a row of plants will be automatically cut down so that other plants will be left standing at regular intervals and the growth of the plants so left will be promoted. The invention seeks to provide a machine in which the cutting member will be moved across the row of plants in a manner similar to the sweep of a hoe manually manipulated and to that end the invention has for its object, the provision of simple mechanism whereby the rotary motion of the axle will be converted into an oscillatory movement of the blade. Other incidental objects of the invention will appear in the course of the following description and the invention resides in certain novel features which will be particularly pointed out in the appended claims.

In the accompanying drawings I have shown one embodiment of the invention and in the said drawings—

Fig. 2 is a longitudinal section on the line 2—2 of Fig. 1;

Fig. 3 is a rear end elevation, the seat and the caster wheel being omitted;

Fig. 6 is a detail perspective showing the pin and slot connection between the horizontal rock arm and the crank for actuating it.

Figure 1:
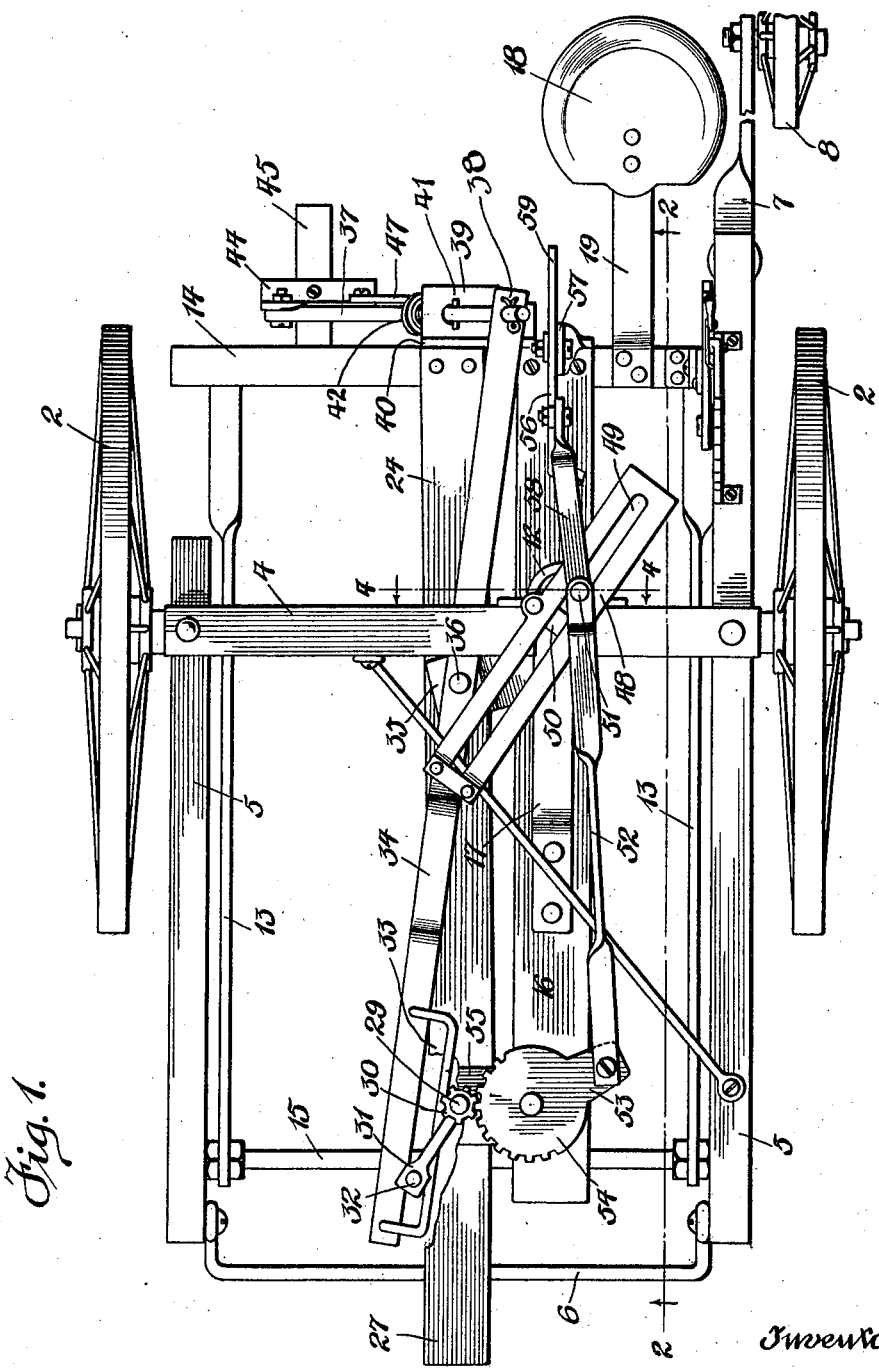
Figure 1 is a plan view partly broken away of a cotton chopper embodying my improvements.
Figure 5:
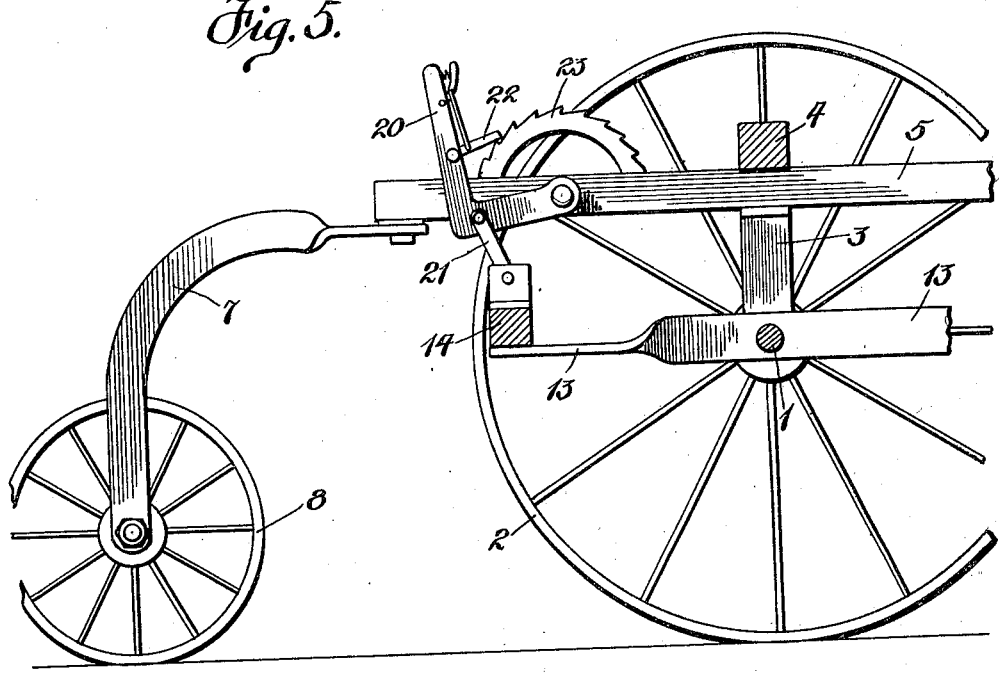
Fig. 5 is a detail sectional elevation more particularly showing the caster wheel and the connection between the main frame and the supplemental frame.
Figure 4:
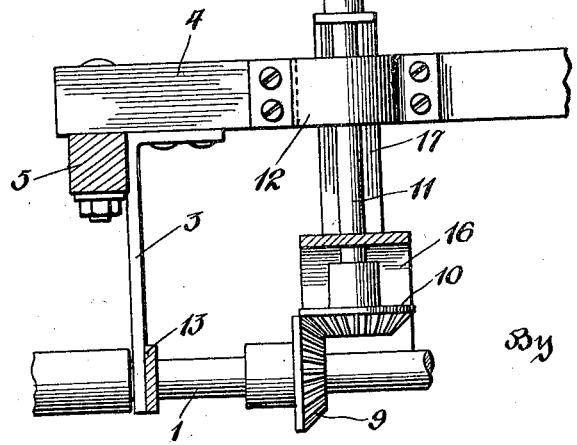
Fig. 4 is a transverse section on the line 4—4 of Fig. 1.

In carrying out the invention, I employ an axle 1 upon the ends of which are mounted ground wheels 2 which are connected with the axle by the usual escapements so that no motion will be imparted to the axle if the machine be moved backwardly and the difference in the speed of rotation of the two wheels will be accommodated when the machine is turning a corner. The axle is journaled in suitable bearings provided in standards or hangers 3 forming a part of the main frame and secured at their upper ends to a cross beam 4 and side bars 5 which complete the main frame. The front ends of the side bars 5 are connected by a draft bar 6 to which draft animals or a tractor may be coupled so that the machine may be drawn over a field and along a row of plants to be thinned. The invention also comprehends the use of ordinary cultivator blades in connection with the cutter and these blades may be coupled to the main frame in any desired manner. Inasmuch, however, as the particular construction or form of these blades forms no part of my particular invention I have deemed illustration of the same unnecessary. To the rear end of one side bar 5, I pivotally attach a standard 7 carrying a caster wheel 8 at its lower end to aid in supporting the machine and this caster wheel may be of any well-known type. Upon the axle 1 near one end thereof, I secure a beveled gear 9 which meshes with a similar gear 10 on the lower end of a vertical shaft 11 which rises to a point above the cross bar 4, the said cross bar being formed in two sections connected by a strap or coupling 12 to accommodate the oscillatory movement of the said shaft 11 as the supplemental frame is rocked.

Loosely mounted upon the axle adjacent the standards or hangers 3 are the side bars 13 of a supplemental frame which carries the chopper blade and the mechanism for driving the same. The rear ends of the side bars 13 are connected by a cross bar 14 whereby the said bars 13 are maintained in a fixed spaced relation and the front ends of the said side bars are held in a like fixed spaced relation by a cross bar 15 rigidly secured in and extending between the front ends of the side bars, as clearly shown in Fig. 1. A longitudinal brace 16 extends between the bars 14 and 15 and is arched between its ends so as to rise over the pinion 10 and provide a bearing or support for the shaft 11 above the said pinion. A bracket 17 is secured upon the brace 16 and rises therefrom to a point above the cross bar 4 of the main frame and has its upper end fitted around the upper portion of the shaft 11 so as to provide a bearing and support for the same. The vertical driving shaft 11 is thus carried by the supplemental frame and the said frame is capable of rocking movement upon the axle without varying the horizontal position of the main frame so that the strain upon the draft animals will be the same whether the supplemental frame be set to cause a deeper or shallower cut by the chopper blade or set to hold the said blade above the ground. The driver's seat 18 is carried by a standard 19 secured to the rear cross bar 14 of the supplemental frame and a hand lever 20 is fulcrumed upon the main frame adjacent the rear end thereof within convenient reach of the driver and connected by a link 21 with the rear cross bar 14 of the supplemental frame. The said lever carries a pawl 22 adapted to engage a ratchet bar 23 on the main frame so that the lever may be effectually held in any position in which it may be set.

A longitudinal beam 24 is secured to the cross bars 14 and 15 of the supplemental frame and to the front end of this beam I secure a bracket consisting of a forwardly extending foot piece 25, a standard 26 rising from the front end of the foot piece 25 and rearwardly projecting arms 27 and 28 extending from the upper extremity and from an intermediate point of the said standard 26, respectively. In the ends of the said arms 27 and 28, I journal a vertical rock shaft 29 which is equipped with a pinion 30 at its upper end and with a crank 31 at its lower end. The crank 31 carries a wrist pin 32 which plays in a longitudinal slot 33 in a rock arm 34 which extends to the rear end of the machine and is fulcrumed intermediate its ends upon a bracket 35 secured to and projecting laterally from the arched brace 16. The fulcrum pin 36 passes through and below the said bracket 35 and has its lower end stepped in the beam 24 so that the said fulcrum or pivot pin will be firmly supported and held against lateral movement or bending. To avoid the use of a wide rock arm with its surplus weight, the slot 33 is provided by a bail disposed longitudinally of the rock arm and having its ends fixed to said arm with its intermediate portion spaced from and parallel with the adjacent side edge of the arm but any form of pin and slot connection between the arm and the crank may be employed. The rear end of the rock arm 34 is loosely fitted over the upper end of the shank or stem 37 of the chopper and a pin or lug 38 is provided in the said stem or shank to rest upon the rear end of the rock arm and thereby maintain the parts in operative relation. The chopper shank or stem passes through the rearwardly projecting lip 39 of a bracket 40 which is rigidly secured to the cross bar 14 of the supplemental frame and a pin 41 is inserted through the stem immediately above the said lip so as to support the stem thereon. A collar or other stop 42 is provided upon the stem or shank below the lip 39 and a spring 43 is coiled around the shank between the said collar or stop and the lip 39 so that it tends to hold the shank in a lowered position but will accommodate the lateral oscillatory movement of the shank in the operation of the machine and will yield to impact of the chopper upon a stone or other obstruction which may be encountered in the travel of the machine along the row of plants. The lower end of the shank or stem 37 is pivoted to a carrier 44 which is shown as an angle bar disposed transversely of the machine and having its vertically disposed web pivoted to the shank. The chopper blade 45 is secured to the horizontally disposed web of this carrier and may be of any desired length. It is also to be noted that this blade may be equipped with rake teeth so as to clear away pebbles which may be lying adjacent the stems of the plants and it may also have its cutting edge formed in a series of teeth instead of a single continuous edge, as shown. The bracket 40 is provided with a depending lug 46 and a link 47 has its upper end pivoted to the said lug and its lower end pivoted to the vertical web of the carrier 44, as shown, this arrangement serving to maintain the horizontal position of the carrier at all times so that the blade will always be in the proper position to cut through the plants.

To the upper end of the driving shaft 11, I secure a driving crank in the form of a plate 48 having a longitudinal slot 49 and a slide 50 is fitted in the opposed grooved walls of the slot 49 as will be readily understood. A pin 51 is loosely fitted in the slide 50 and upon the said pin is pivotally engaged the rear end of a pitman 52 which has its front end pivoted to the lateral arm 53 of a gear 54 which meshes with the pinion 30, the said gear 54 being mounted upon an offset 55 at the rear end of the arm 27. It will now be readily understood that the rotation of the shaft 11 will be imparted directly to the crank 48 and the slide 50 with the pin 51 will follow the movement of the crank so that the pitman 52 will be moved alternately forward and backward and the gear 54 consequently oscillated so as to rock the shaft 29 through the pinion 30. The rocking of the shaft 29 will oscillate the arm 31 transversely of the machine and the pin 32 will be thereby caused to play in the slot 33 so as to vibrate the rock arm 34. The arm 34 will obviously swing the shank or stem 37 so that the chopper blade 45 will be carried back and forth across the path of the machine and will cut through the row of plants so as to remove some of the plants at regular intervals.

If it be desired to hold the chopper inoperative, the pin 51 is shifted to a point where it will be in axial alinement with the driving shaft 11 and this result is accomplished by a hand lever 56 fulcrumed upon a standard 57 rising from the cross bar 14 and connected with the pin 51 by a link 58. The lever 56 has a rearwardly extending arm 59 which may be readily grasped by the driver upon the seat 18 and also has a downwardly extending arm 60 equipped with a foot rest 61 so that the driver by pressing with his foot upon said rest may hold the lever in such position that the pin 51 will be held directly over the shaft 11. Of course, when the pin is in said position it will remain neutral and the crank 48 will simply rotate around the pin without imparting any motion thereto.

From the foregoing description, taken in connection with the accompanying drawings, it will be seen that I have provided a very compactly arranged machine in which all the parts are of simple construction. The operating mechanism is actuated directly from the axle and the strain upon the draft animals will not be heavy. By properly manipulating the lever 20, the supplemental frame may be rocked about the axle as a center and the chopper consequently set to cut closer to the ground or just below the surface of the same or may be so set that the chopper will operate at a point appreciably above the ground and the main frame will remain in a horizontal position in all adjustments of the supplemental frame. The lever 56, when the machine is at work, will oscillate with the slide and the pin 51, and the link 58 is loosely fitted upon the said pin so that it will readily accommodate the movement. If, however, the pin be adjusted to the neutral position as previously described and the lever then held in that position the slide will remain relatively at rest and the chopper will not be operated. It will be readily noted that the chopper cuts across the plants intermittently instead of rotating constantly and it, therefore, makes a square cut across the stems of the plants and is certain in its action. The machine is intended more particularly for use in cutting out cotton plants but it may be employed in beet fields or for thinning onion plants or any other vegetation requiring similar cultivation.

The draft may be applied at that end of the machine to which the caster wheel is attached, if so desired, the driver's seat being then reversed, and other changes in the minor details of construction and arrangement may be made without departing from the principles of the invention as the same is defined in the following claims.

Having thus described the invention, what is claimed as new is:

1. In a machine for the purpose set forth, the combination of a frame, a chopper shank mounted upon the frame for transverse vibratory movement, a carrier pivoted to the lower end of said shank, a link pivotally connected to the frame and to said carrier, a blade secured to the carrier, and means on the frame acting upon the upper end of the chopper shank for vibrating the same.

2. In a machine for the purposes set forth, the combination of a frame, a chopper shank mounted upon the frame for transverse vibratory movement, means acting upon said shank for yieldably holding the same in a lowered position, a link pivotally hung upon the frame adjacent the shank and parallel therewith, a carrier pivoted to the lower ends of the shank and the link, and a blade secured to said carrier.

3. In a machine for the purposes set forth, the combination of a frame, a rock arm fulcrumed intermediate its ends upon the said frame, a chopper mounted upon the frame for transverse vibratory movement and engaged in the rear end of the rock arm, the forward end of the rock arm being provided with a longitudinal slot, a vertically disposed rock shaft on the frame adjacent the rock arm, a crank carried by the lower end of said shaft and having a pin playing in the longitudinal slot of the rock arm, and means upon the frame for actuating said rock shaft.

4. In a machine for the purposes set forth, the combination of a frame, a vertically disposed shaft carried by said frame, means acting on said shaft for rotating the same, a longitudinally slotted crank plate secured upon the upper end of said shaft, a slide fitted in the slot of said crank plate, a pin loosely fitted in said slide, a gear mounted upon the forward portion of the frame, a pitman connecting said gear with the said pin in the slide, a chopper mounted upon the rear end of the frame for transverse vibratory movement, and operative connections between the said chopper and the said gear.

5. In a machine for the purposes set forth, the combination of a frame, a vertically disposed drive shaft mounted upon the frame, means acting on the lower end of said shaft for rotating the same, a longitudinally slotted crank plate secured to the upper end of said shaft, a slide fitted in said slotted crank plate, a pin fitted loosely in said slide, a chopper mounted upon the frame for transverse vibratory movement, operative connections between the said pin and said chopper, and means for moving said pin into axial alinement with the vertical driving shaft whereby the chopper will be held inoperative.

In testimony whereof I affix my signature.

WILLIAM H. SMITH. [L. S.]